US012432498B2

(12) United States Patent
Laaksonen et al.

(10) Patent No.: US 12,432,498 B2
(45) Date of Patent: Sep. 30, 2025

(54) SELECTIVE MODIFICATION OF STEREO OR SPATIAL AUDIO

(71) Applicant: Nokia Technologies Oy, Espoo (FI)

(72) Inventors: Lasse Juhani Laaksonen, Tampere (FI); Miikka Tapani Vilermo, Tampere (FI); Arto Juhani Lehtiniemi, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 147 days.

(21) Appl. No.: 18/353,282

(22) Filed: Jul. 17, 2023

(65) Prior Publication Data

US 2024/0056734 A1 Feb. 15, 2024

(30) Foreign Application Priority Data

Aug. 12, 2022 (EP) .................................... 22190219

(51) Int. Cl.
*H04R 5/00* (2006.01)

(52) U.S. Cl.
CPC .................................... *H04R 5/00* (2013.01)

(58) Field of Classification Search
CPC .............................. H04R 5/00; H04R 2410/07
See application file for complete search history.

(56) References Cited

U.S. PATENT DOCUMENTS 11,217,264 B1 1/2022 Yang et al.
11,258,940 B2 * 2/2022 Kasugai ............... H04N 23/631
2007/0021958 A1 * 1/2007 Visser ..................... G10L 25/78 704/226
2008/0226098 A1 9/2008 Haulick et al.
2010/0123785 A1 * 5/2010 Chen .................... H04N 23/611 382/118
2013/0342731 A1 * 12/2013 Lee .......................... H04R 5/04 348/231.4
2019/0253795 A1 * 8/2019 Ozcan .................. H04R 1/1083
2022/0021970 A1 1/2022 Vilermo et al.
2022/0068290 A1 3/2022 Mate et al.
2023/0319469 A1 * 10/2023 Vilkamo ................ H04R 5/027 381/1

FOREIGN PATENT DOCUMENTS

JP H03-106299 A 5/1991

OTHER PUBLICATIONS

"IVAS Design Constraints (IVAS-4)", 3GPP TSG SA WG4#118-e meeting, S4-220551, Agenda: 15.2, Editor, Apr. 6-14, 2022, pp. 1-15.

(Continued)

*Primary Examiner* — Jason R Kurr
(74) *Attorney, Agent, or Firm* — ALSTON & BIRD LLP

(57) ABSTRACT

An apparatus, method and computer program is described comprising: providing a stereo or spatial audio signal produced using individual signals from respective microphones of a user device, the stereo or spatial audio signal representing an audio scene; detecting unwanted noise in at least one of the individual signals; responsive to detecting the unwanted noise, modifying the stereo or spatial audio signal based on a determined level of spatial interest in the audio scene meeting a predetermined condition; and providing the modified audio signal for output via one or more speakers.

20 Claims, 6 Drawing Sheets

(56) References Cited

OTHER PUBLICATIONS

Extended European Search Report received for corresponding European Patent Application No. 22190219.0, dated Feb. 2, 2023, 11 pages.
"AirPods redefine the personal audio experience", Apple, Retrieved on Jul. 13, 2023, Webpage available at : https://www.apple.com/newsroom/2023/06/airpods-redefine-the-personal-audio-experience/.

* cited by examiner

SELECTIVE MODIFICATION OF STEREO OR SPATIAL AUDIO

FIELD

Example embodiments relate to selective modification of stereo or spatial audio in the presence of unwanted noise. This may be based on a determined level of spatial interest in an audio scene represented by said stereo or spatial audio.

BACKGROUND

User devices may comprise two or more microphones for the capture of sounds and generation of respective audio signals. For example, a user device, e.g., a smartphone, earphones, earbuds, headset or head-mounted display device, may comprise first and second microphones for capturing real-world sounds and producing individual first and second audio signals. The individual first and second audio signals may be processed to produce a stereo audio signal for output. A spatial audio signal, i.e., an audio signal that includes a spatial percept, may similarly be produced, for example if there are further microphones on the user device at different respective positions. Ambisonics and Metadata-Assisted Spatial Audio (MASA) are two known spatial audio formats.

Stereo or spatial audio signals may represent an audio scene comprising one or more audio sources. A user listening to stereo or spatial audio signals may experience a better sense of audio direction and/or immersion in the audio scene although unwanted noise picked-up by one or more of the microphones may detract from the experience. Wind noise is an example of unwanted noise.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising means for: providing a stereo or spatial audio signal produced using individual signals from respective microphones of a user device, the stereo or spatial audio signal representing an audio scene; detecting unwanted noise (e.g. wind noise) in at least one of the individual signals; responsive to detecting the unwanted noise, modifying the stereo or spatial audio signal based on a determined level of spatial interest in the audio scene meeting a predetermined condition; and providing the modified audio signal for output via one or more speakers.

In some example embodiments, the modifying means is configured to produce a reduced directional and/or spatial representation of the audio scene. The audio scene may, for example, be represented by a stereo signal and wherein the modifying means is configured to produce a monaural version of the audio scene. The audio scene may, for example, be represented by a spatial audio signal and wherein the modifying means is configured to produce a stereo or monaural version of the audio scene.

In some example embodiments, the modifying means is configured to produce a monaural version of the audio scene and to provide the monaural version on first and second channels for stereo output via at least two speakers.

In some example embodiments, the modifying means is configured to produce the reduced directional and/or spatial representation of the audio scene by suppressing the at least one individual signal in which the unwanted noise is detected. The modifying means may, for example, be configured to suppress the at least one individual signal by disabling the respective microphone(s) which produce the at least one individual signal in which the unwanted noise is detected.

In some example embodiments, the modifying means is configured to modify the stereo or spatial audio signal until the unwanted noise is at least no longer detected in at least one of the individual signals.

The apparatus may further comprise means for identifying significant audio sources in the audio scene, wherein the level of spatial interest in the audio scene is a value based, at least in part, on the number of the significant audio sources in the audio scene, and wherein the predetermined condition is met if the value is below a predetermined threshold. The significant audio sources may be identified based on respective properties of one or more audio sources in the audio scene. The respective properties may comprise one or more of: frequency band; energy level; type of audio source; temporal activity over a predetermined time period; direction relative to a reference direction of the user device; and direction relative to a gaze direction of a user of the user device.

Significant audio sources may be identified based at least in part on one or more of the audio sources in the audio scene being speech-type audio source(s). Alternatively, or in addition, significant audio sources may be identified based at least in part on one or more of the audio sources in the audio scene having a direction within a predetermined angle (e.g. 180 degrees of less) of a reference direction of the user device (such as a direction of a camera of the user device) or the gaze direction of the user of the user device.

According to a second aspect, this specification describes a method, comprising: providing a stereo or spatial audio signal produced using individual signals from respective microphones of a user device, the stereo or spatial audio signal representing an audio scene; detecting unwanted noise (e.g. wind noise) in at least one of the individual signals; responsive to detecting the unwanted noise, modifying the stereo or spatial audio signal based on a determined level of spatial interest in the audio scene meeting a predetermined condition; and providing the modified audio signal for output via one or more speakers.

Said modifying may produce a reduced directional and/or spatial representation of the audio scene.

Said modifying may produce a monaural version of the audio scene and to provide the monaural version on first and second channels for stereo output via at least two speakers.

Said modifying may produce the reduced directional and/or spatial representation of the audio scene by suppressing the at least one individual signal in which the unwanted noise is detected.

Said modifying may modify the stereo or spatial audio signal until the unwanted noise is at least no longer detected in at least one of the individual signals.

The method may comprise identifying significant audio sources in the audio scene, wherein the level of spatial interest in the audio scene is a value based, at least in part, on the number of the significant audio sources in the audio scene, and wherein the predetermined condition is met if the value is below a predetermined threshold.

According to a third aspect, this specification describes a computer program comprising instructions for causing an apparatus to perform at least the following: providing a stereo or spatial audio signal produced using individual signals from respective microphones of a user device, the stereo or spatial audio signal representing an audio scene; detecting unwanted noise (e.g. wind noise) in at least one of the individual signals; responsive to detecting the unwanted noise, modifying the stereo or spatial audio signal based on a determined level of spatial interest in the audio scene meeting a predetermined condition; and providing the modified audio signal for output via one or more speakers. The computer program may be configured to cause the apparatus to perform any aspect of the second aspect.

According to a fourth aspect, this specification describes a computer-readable medium (such as a non-transitory computer-readable medium) comprising program instructions stored thereon for performing at least the following: providing a stereo or spatial audio signal produced using individual signals from respective microphones of a user device, the stereo or spatial audio signal representing an audio scene; detecting unwanted noise (e.g. wind noise) in at least one of the individual signals; responsive to detecting the unwanted noise, modifying the stereo or spatial audio signal based on a determined level of spatial interest in the audio scene meeting a predetermined condition; and providing the modified audio signal for output via one or more speakers. The program instructions may be configured to perform any aspect of the second aspect.

According to a fifth aspect, this specification describes an apparatus comprising: at least one processor; and at least one memory including computer program code which, when executed by the at least one processor, causes the apparatus to: providing a stereo or spatial audio signal produced using individual signals from respective microphones of a user device, the stereo or spatial audio signal representing an audio scene; detecting unwanted noise (e.g. wind noise) in at least one of the individual signals; responsive to detecting the unwanted noise, modifying the stereo or spatial audio signal based on a determined level of spatial interest in the audio scene meeting a predetermined condition; and providing the modified audio signal for output via one or more speakers. The apparatus may be caused to perform any aspect of the second aspect.

According to a sixth aspect, this specification describes: an input module (or some other means) for providing a stereo or spatial audio signal produced using individual signals from respective microphones of a user device, the stereo or spatial audio signal representing an audio scene; a noise detector (or some other means) for detecting unwanted noise (e.g. wind noise) in at least one of the individual signals; a processor (or some other means) for responsive to detecting the unwanted noise, modifying the stereo or spatial audio signal based on a determined level of spatial interest in the audio scene meeting a predetermined condition; and an output module (or some other means) for providing the modified audio signal for output via one or more speakers.

DRAWINGS

Embodiments will be described, by way of non-limiting example, with reference to the accompanying drawings as follows.

Figure 10:
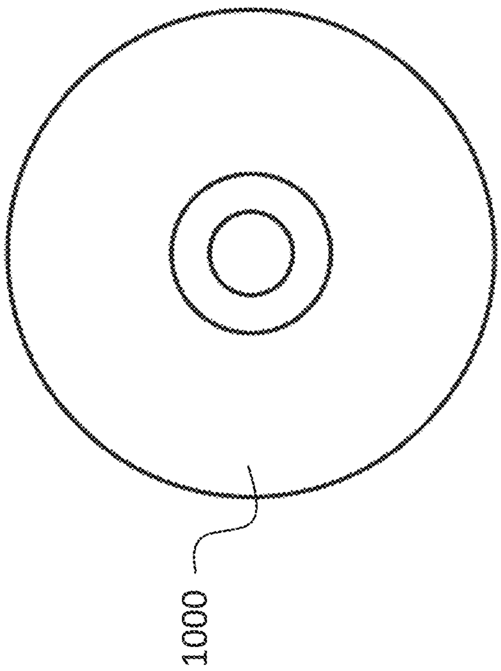

FIG. 10 to shows a non-transitory media according to some example embodiments.

DETAILED DESCRIPTION

Example embodiments relate to selective modification of stereo or spatial audio in the presence of unwanted noise and based on a determined level of spatial interest in an audio scene represented by said stereo or spatial audio.

It is known to provide user devices such as (but not limited to) smartphones, earphones, earbuds, headsets or head-mounted display devices which have two or more microphones mounted thereon or therein. Each microphone may capture sounds and generate respective individual audio signals. The individual audio signals may be processed, e.g., encoded using a suitable codec, to produce a stereo or spatial audio signal representing an audio scene.

Stereo or spatial audio signals may provide a more realistic and/or immersive audio experience for a user when output to first and second speakers of an "output user device" which may (or may not be) the "capturing user device" which comprises the two or more microphones.

For example, in the case of spatial audio, a suitable processor or codec may be used to produce or transmit spatial audio conforming to a particular standard or format such as Ambisonics or MASA. The listening user may be able to perceive different audio sources, e.g., one or more of people speaking, vehicle noises, background noise, etc. coming from different respective directions and distances in the audio scene. As the listening user explores the audio scene via rotational and/or translational movement, the spatial audio signal may be processed so that one or more of the different audio sources are perceived as staying in the same spatial position. This processing may be referred to as head-tracking or similar.

Processing may be performed in the digital domain. Therefore, references herein to individual audio signals, as well as stereo or spatial audio signals, are intended to cover references to audio data representing audio signals and which may be processed using, at least in part, one or more processors and/or controllers which may execute according to computer-readable code.

Unwanted noise, such as wind noise, can detract from the listening user's experience. Wind noise may be captured by at least one of the two or more microphones of the capturing user device. Wind noise, as well as being disturbing, can also affect the stability of the captured audio scene because wanted information from the at least one microphone can be lost or become erroneous. For example, in the case of spatial audio signals, there may be a back-and-forth "pumping" effect between spatial and non-spatial audio, which can be highly disturbing for the listening user. One might consider switching from spatial to non-spatial audio or disabling one or more of the microphones from which wind noise is being captured, but the user will then lose the immersive experience.

Methods and systems for detecting unwanted noise, e.g., wind noise, are known in the art and hence a detailed discussion is not provided herein. For example, such methods and systems may appreciate that wind noise has signal energy concentrated below 1 kHz, even below 500 Hz, and hence may measure the ratio of the power spectrum for such lower frequencies over the total power spectrum for all frequencies. Wind noise may be identified based on the ratio being above a predetermined threshold. Alternative or additional techniques may involve analysis of other signal characteristics, usually involving signal to noise ratio (SNR) analysis, and/or the use of trained computational models which may classify individual audio signals as noise or non-noise accordingly. Methods and systems for performing active noise reduction (ANR) of unwanted noise, such as wind noise, are also known in the art and hence a detailed discussion is not provided herein.

Figure 1:
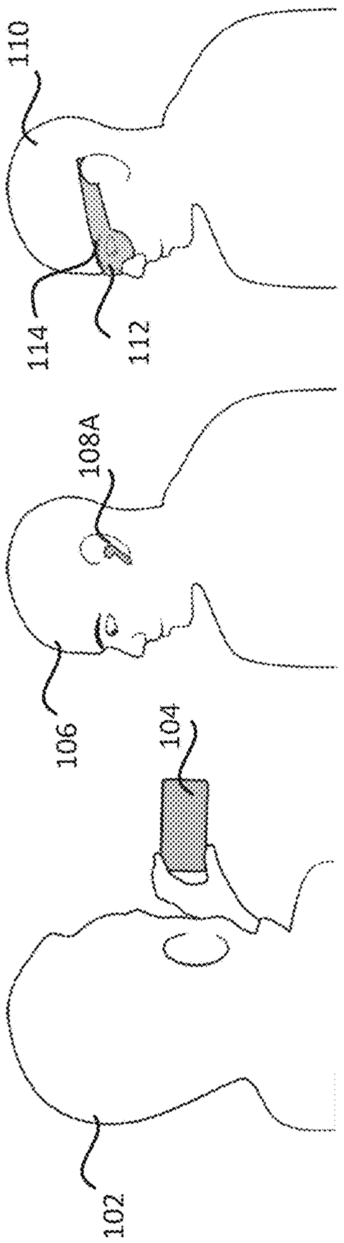
FIG. 1 shows different audio capture and rendering scenarios which may be useful for understanding example embodiments.

FIG. 1 shows different audio capture and rendering scenarios which may be useful for understanding example embodiments. For example, a first user 102 may use a smartphone 104 comprising at least first and second microphones. A second user 106 may use a pair of earbuds (only a left-hand earbud 108A is shown) with each earbud comprising at least one microphone as well as a speaker. A third user 110 may use a head-worn device such as a pair of smart glasses or goggles 112 incorporating first and second microphones, e.g., a left and right-hand microphone on respective arms 114. A speaker may be provided at or near the rear ends of the respective arms 114 for audio output.

Figure 2A:
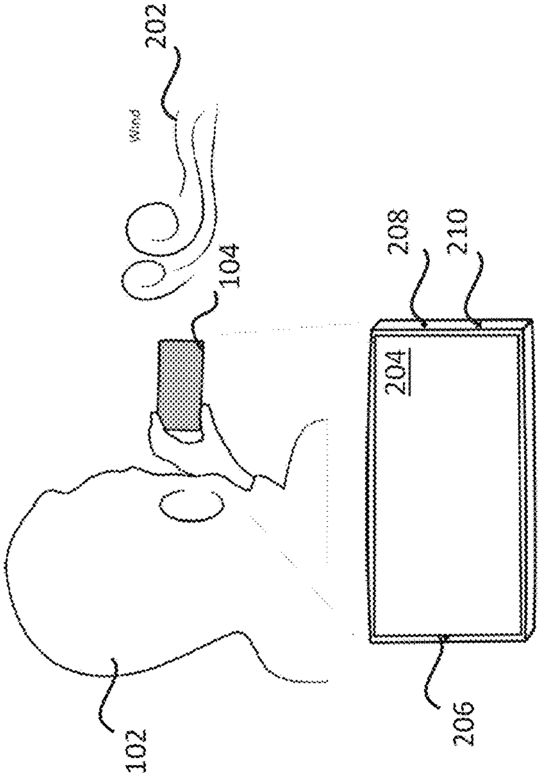
FIG. 2A shows a first user and a smartphone in accordance with an example embodiment.

FIG. 2A shows the first user 102 and smartphone 104. Wind 202 is shown coming from the right-hand side of the smartphone 104. It is seen that the smartphone 104 includes a display screen 204 and first, second and third microphones 206, 208, 210 on the body of the smartphone.

Figure 2B:
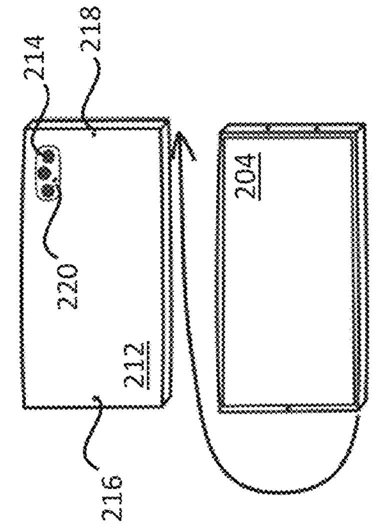
FIG. 2B shows a reverse side of the smartphone of FIG. 2A.

FIG. 2B shows the reverse side 212 of the smartphone 104 which includes at least one camera 214. It is seen that the smartphone 104 further comprises fourth, fifth and sixth microphones 216, 218, 220 on the body. Hence, the first, fifth and sixth microphones 206, 218, 220 are more towards the left-hand side of the smartphone 104 whereas the second, third and fourth microphones 208, 210 and 216 are more towards the right-hand side of the smartphone.

Detection of wind noise may use any known method or system and may involve identifying a value of wind noise above a predetermined threshold, possibly for greater than a predetermined time period, in one or more individual signals captured by at least some of the first to sixth microphones 206, 208, 210, 216, 218, 220. For example, it may be that wind noise is detected in each of the second, third and fourth microphones 208, 210 and 216.

Wind noise detection may be performed using means provided, at least in part, by the smartphone 104. Similarly, further processing operations according to example embodiments to be described herein may use means provided, at least in part, by the smartphone 104. For example, the means may comprise at least one processor and at least one memory directly connected or coupled to the at least one processor. The at least one memory may include computer program code which, when executed by the at least one processor, may perform processing operations and any preferred features thereof described below.

Figure 3:
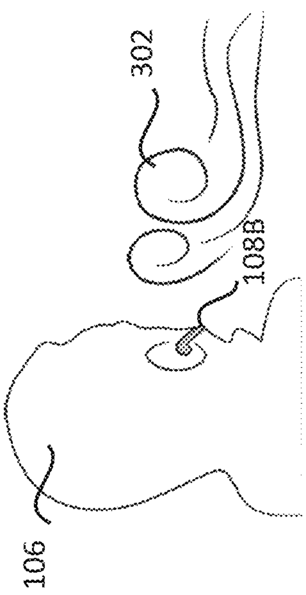
FIG. 3 shows a user wearing an earbud in accordance with an example embodiment.

In another scenario, FIG. 3 shows the second user 106 wearing a right-hand earbud 108B of the set of earbuds shown in FIG. 1. It may be assumed that the left-hand earbud 108A is also being worn. Wind 302 is coming from the right-hand side of the second user 106.

Figure 4:
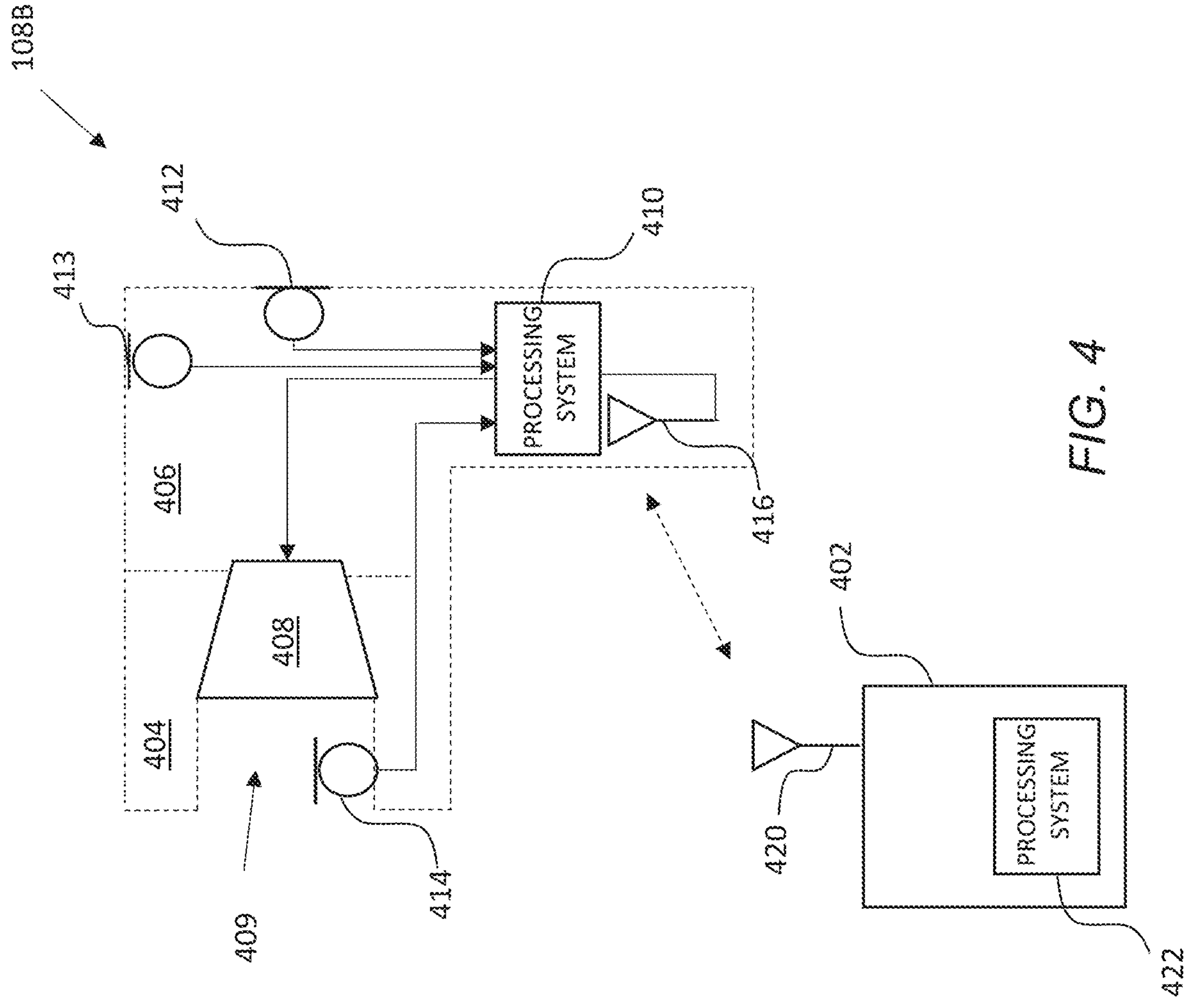
FIG. 4 shows a system in accordance with an example embodiment.

FIG. 4 is an example system comprising the right-hand earbud 108B shown in FIG. 3, and an associated other user device 402 which may be a smartphone, tablet computer, personal computer, laptop, wearable, to give some non-limiting examples. It will be appreciated that the left-hand earbud 108A, not shown in the figure, may comprise the same hardware and functionality.

The right-hand earbud 108B may comprise a body comprised of an ear-insert portion 404 and an outer portion 406. The ear-insert portion 404 is arranged so as to partly enter a user's ear canal in use, whereas the outer portion 406 remains substantially external to the user's ear in use. A speaker 408 may be positioned within the ear-insert portion 404 and is directed such that sound waves are emitted in use through an aperture 409 defined within the ear-insert portion, towards a user's ear. The aperture 409 may or may not be closed-off by a mesh or grille (not shown).

The right-hand earbud 108B may comprise a processing system 410 within, for example, the outer portion 406. The processing system 410 may comprise one or more circuits, processors, controllers, application specific integrated circuits (ASICs) or FPGAs. The processing system 410 may operate under control of computer-readable instructions or code, which, when executed by the one or more circuits, processors, controllers, ASICs or FPGAs, may perform at least some operations described herein. The processing system 410 may be configured to provide, for example, conventional ANR functionality and/or unwanted noise detection, e.g., wind noise detection.

In some cases, it may be the other user device 402 that provides at least some functionality based on individual audio signals received from the right-hand earbud 108B as well as the left-hand earbud 108A.

The right-hand earbud 108B may also comprise a first microphone 412 mounted on or in the outer portion 406. One or more other "external" microphones, such as a second microphone 413, may be mounted on or in the outer portion 406. The first and second microphones 412, 413 are connected to the processing system 410 so as to provide, in use, audio data representative of sounds picked-up by the first and second microphones.

The right-hand earbud 108B may also comprise a third microphone 414 mounted on or in the aperture 409 of the ear-insert portion 404. One or more other "interior" microphones may be mounted on or in the aperture 409 of the ear-insert portion 404. The third microphone 414 is connected to the processing system 410 and may provide, in use, a feedback signal which may be useful for ANR.

Provision of first, second and third microphones 412, 413, 414 is not essential and example embodiments are applicable to the right-hand earbud 108B having only one microphone, two microphones or more than three microphones.

The right-hand earbud 108B may also comprise an antenna 416 for communicating signals with an antenna 420 of the other user device 402. The antenna 416 is shown connected to the processing system 410 which may be assumed to comprise transceiver functionality, e.g., for Bluetooth, Zigbee and/or WiFi communications. The other user device 402 may also comprise a processing system 422 having one or more circuits, processors, controllers, application specific integrated circuits (ASICs) or FPGAs for providing user device functionality 118 such as that of a smartphone, digital assistant, digital music player, personal computer, laptop, tablet computer or wearable device such as a smartwatch. As noted above, it may be the other user device 402 that provides at least some processing operations to be described herein based on individual audio signals received from the right-hand earbud 108B as well as the left-hand earbud 108A.

Referring back to FIG. 3, it may be the individual audio signal received from the right-hand earbud 108B on which unwanted noise, e.g., wind noise, is detected.

Figure 5:
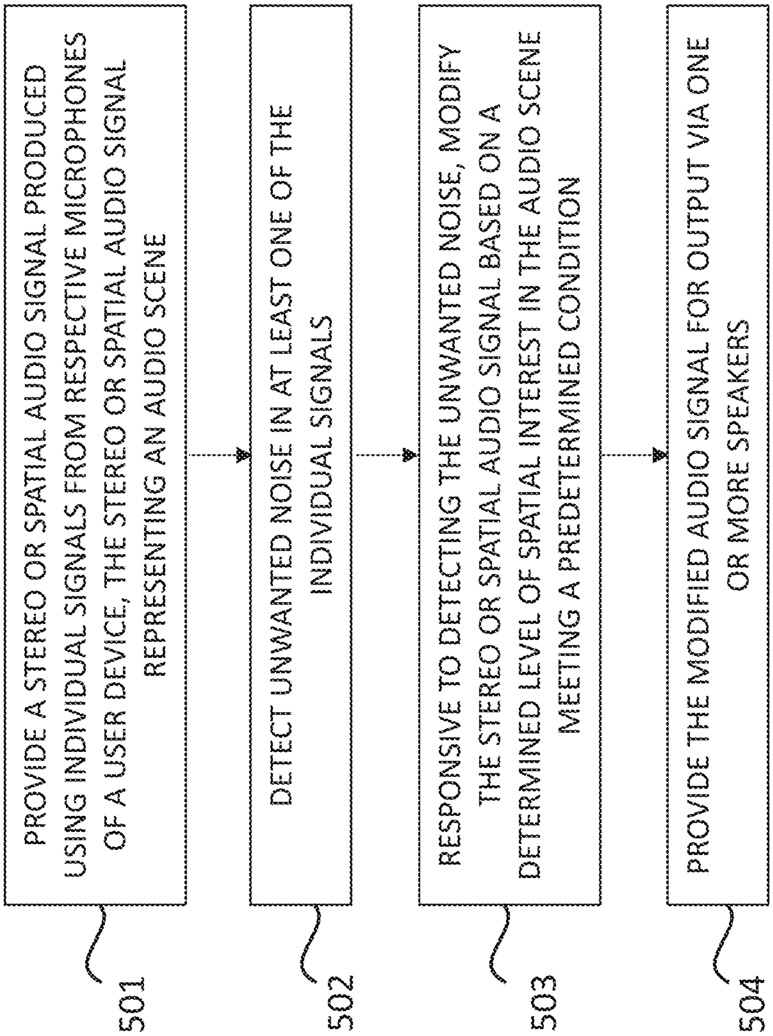
FIG. 5 is a flow diagram indicating processing operations that may be performed according to one or more example embodiments.

Referring to FIG. 5 a flow diagram is shown indicating processing operations that may be performed according to one or more example embodiments. The processing operations may be performed by hardware, software, firmware or a combination thereof.

A first operation 501 may comprise providing a stereo or spatial audio signal produced using individual signals from respective microphones of a user device, the stereo or spatial audio signal representing an audio scene.

A second operation 502 may comprise detecting unwanted noise in at least one of the individual signals.

A third operation 503 may comprise, responsive to detecting the unwanted noise, modifying the stereo or spatial audio signal based on a determined level of spatial interest in the audio scene meeting a predetermined condition.

A fourth operation 504 may comprise providing the modified audio signal for output via one or more speakers.

Regarding the second operation 502, detecting unwanted noise in at least one of the individual signals may employ any one or more known noise detection techniques, such as wind noise detection techniques mentioned above. For example, if one or more characteristics of an individual signal meets a predetermined level and/or for a predetermined amount of time, the individual signal may be determined to include unwanted noise.

Regarding the third operation 503, the modifying may produce a reduced directional and/or spatial representation of the audio scene.

For example, where the audio scene is represented by a stereo signal, the third operation 503 may comprise producing a monaural version of the audio scene.

For example, where the audio scene is represented by a spatial audio signal, the third operation 503 may comprise producing a stereo or monaural version of the audio scene.

In some cases, where the modified signal is a monaural signal, the third operation 503 may further comprise providing the monaural version on first and second channels for output via at least two speakers.

In some cases, the third operation 503 may involve suppressing the at least one individual signal in which the unwanted noise is detected. For example, referring to the embodiment described with reference to FIG. 2A, it may be that individual signals from each of the second, third and fourth microphones 208, 210 and 216 are suppressed. Referring to the embodiment described with reference to FIG. 3, it may be that the individual signal from the right-hand earbud 108B is suppressed. In some cases, suppressing the individual signals may involve disabling the respective one or more microphones that produce the individual signal or respective individual signals in which the unwanted noise is detected. Alternatively, the individual signal(s) may be attenuated.

In some cases, the third operation 503 is performed until the unwanted noise is at least no longer detected in at least one or in all of the individual signals. The previous situation may then be returned to, i.e., back to stereo or spatial rendering.

Regarding the third operation 503, a further operation may involve determining a level of spatial interest in the audio scene. The term "level of spatial interest" may be a metric indicative of how desirable or important it is for the encoded directional or spatial representation (or dimension (s)) to remain. For example, an audio scene with only background noises may have a low level of spatial interest whereas an audio scene with one or more people talking and/or standing generally in front of the user or user device may have a relatively higher level of spatial interest.

One way of determining the level of spatial interest in the audio scene may comprise identifying one or more significant audio sources in the audio scene. The level of spatial interest in the audio scene may then be a value based, at least in part, on the number of the significant audio sources in the audio scene.

The predetermined condition mentioned in relation to the third operation 503 may be met if the value is below a predetermined threshold. This may trigger the modifying of the stereo or spatial audio signal using any one or more of the abovementioned options based on the level of spatial interest being low. Anything at or above the predetermined threshold may mean that no modification is made (so that the stereo or spatial audio signal is maintained) based on level of spatial interest being high.

Basically, there is a trade-off in terms of avoiding or at least mitigating unwanted noise if there is little need for having directional and/or spatial dimensions in the audio scene and maintaining directional and/or spatial dimensionality if there is a need to do so (but at the expense of leaving unwanted noise artefacts in the audio scene.) Having said that, conventional ANR techniques can still be employed to the extent that they may not affect significantly the directional and/or spatial dimensionality.

In some example embodiments, the predetermined condition may be met if there are no significant audio sources, i.e. the predetermined threshold mentioned above is equal to one. In other example embodiments, the predetermined threshold may a larger integer, e.g., two, three, four, etc.

In some example embodiments, what constitutes a significant audio source may be based on respective properties of one or more audio sources in the audio scene. The respective properties may comprise one or more (i.e., a combination) of:

frequency band;

energy level;

type of audio source;

temporal activity over a predetermined time period;

direction relative to a reference direction of the user device; and direction relative to a gaze direction of a user of the user device.

For example, audio sources within a predetermined frequency band may be considered significant audio sources, regardless of other respective properties.

For example, audio sources within this predetermined frequency band and having an above-threshold energy level, possibly for greater than a predetermined time period, may be considered significant audio sources regardless of the other respective properties.

For example, the type of audio source, e.g., human speaker, moving vehicle, musical instrument, may determine if an audio source is significant. One or more known classification techniques for "type of audio source" may be employed, for example using a machine-learning model trained on one or more different known audio sources. For example, a speech-type audio source, such as a person speaking or singing, may be considered a significant audio source.

For example, a significant audio source may be identified based at least in part on the audio source having a direction within a predetermined angle of a reference direction of the user device, i.e., the capturing user device, or the gaze direction of the user of the user device. The reference direction of the user device, for example of the smartphone 104 shown in FIGS. 2A and 2B, may correspond to the direction of the camera 214. For example, any audio source within, for example, a 180-degree field-of-view, i.e. 90 degrees either side of the camera direction, may be determined as significant. The gaze direction of the user of the user device may be determined, for example, if the user device is a headset or head-mounted display device from which the orientation of the user's head may form an estimate of gaze direction. Eye tracking sensors may also be used for estimating gaze direction. Again, any audio source (or any audio source also meeting another condition) within, for example, a 180-degree field-of-view, i.e. 90 degrees either side of the gaze direction, may be determined as significant.

Figure 6:
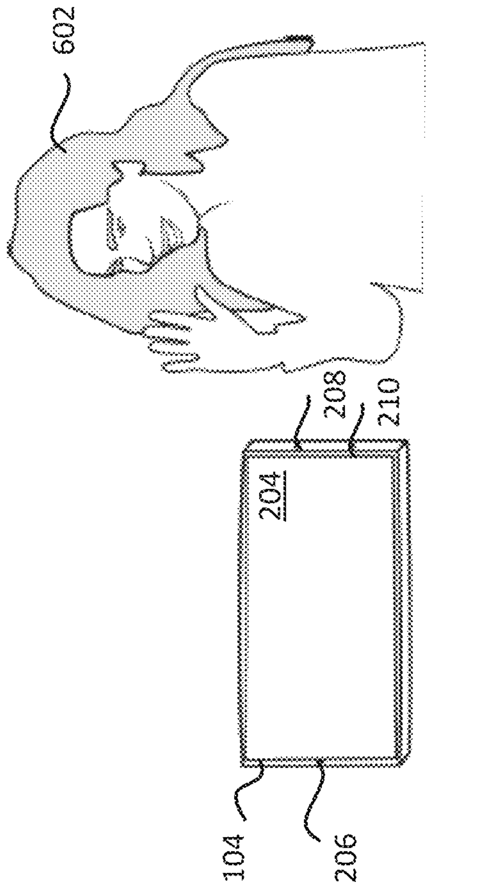
FIGS. 6, 7, 8A and 8B show scenarios in accordance with example embodiments.

FIG. 6 shows, in an example scenario, the smartphone 104 of FIGS. 2A and 2B when used to capture a first audio scene which comprises a first audio source 602, which is a person, generally in-line with a camera direction of the smartphone. In some examples, the first audio source 602 may be considered a significant audio source on the basis that it is a speech-type audio source and is within 180 degrees of the camera direction. The third operation 503 may determine that the level of spatial interest meets the predetermined condition, i.e., there is low spatial interest, because there are less than two significant audio sources in the audio scene, assuming that is the predetermined condition.

Figure 7:
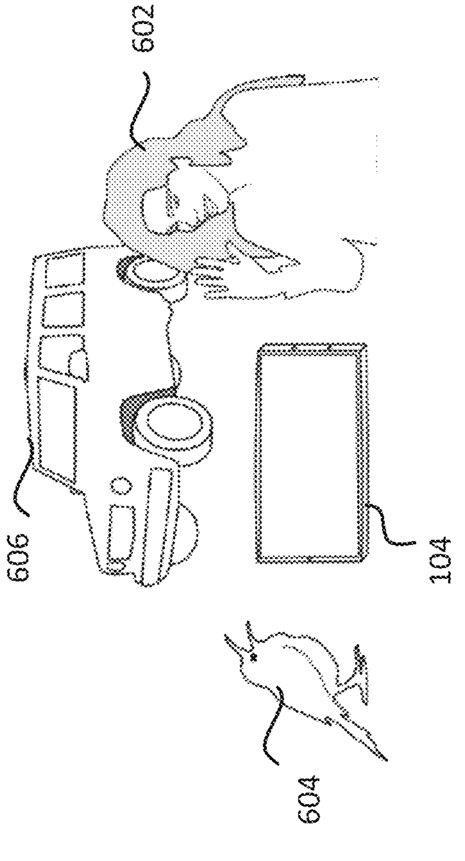

FIG. 7 shows, in a different scenario, the smartphone 104 of FIGS. 2A and 2B when used to capture a second audio scene which comprises the first audio source 602, a second audio source 604 (a bird) and a third audio source 606 (a vehicle), all within 180 degrees of the camera direction. In some examples, the first and second audio sources 602, 604 may be considered significant audio sources. This may be on the basis that the first audio source 602 is a speech-type audio source and the second audio source 604 is within a predetermined frequency band, and both are within 180 degrees of the camera direction. The third audio source 606 may not be considered a significant audio source, on the basis that vehicle-type audio sources and/or the associated frequency band are not classified as significant. The third operation 503 may determine that the level of spatial interest does not meet the predetermined condition, i.e., there is high spatial interest, because there are two significant audio sources in the audio scene.

Figure 8A:
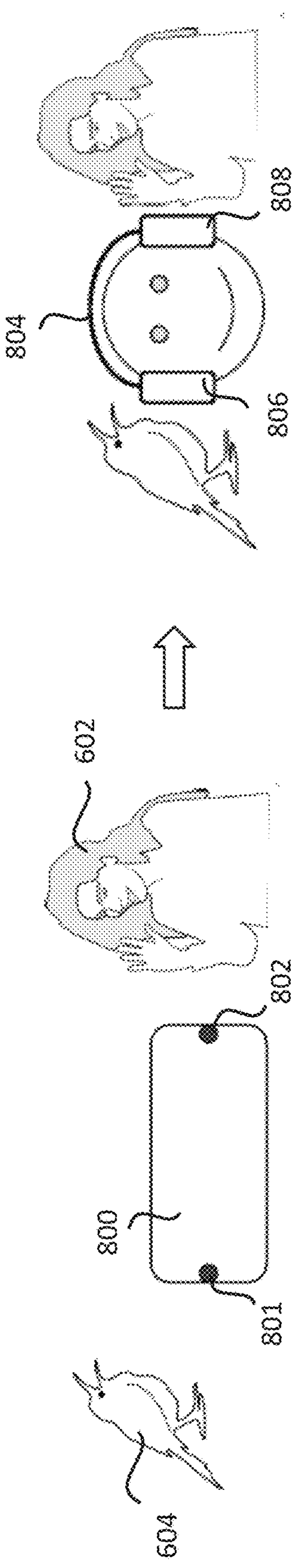
Figure 8B:
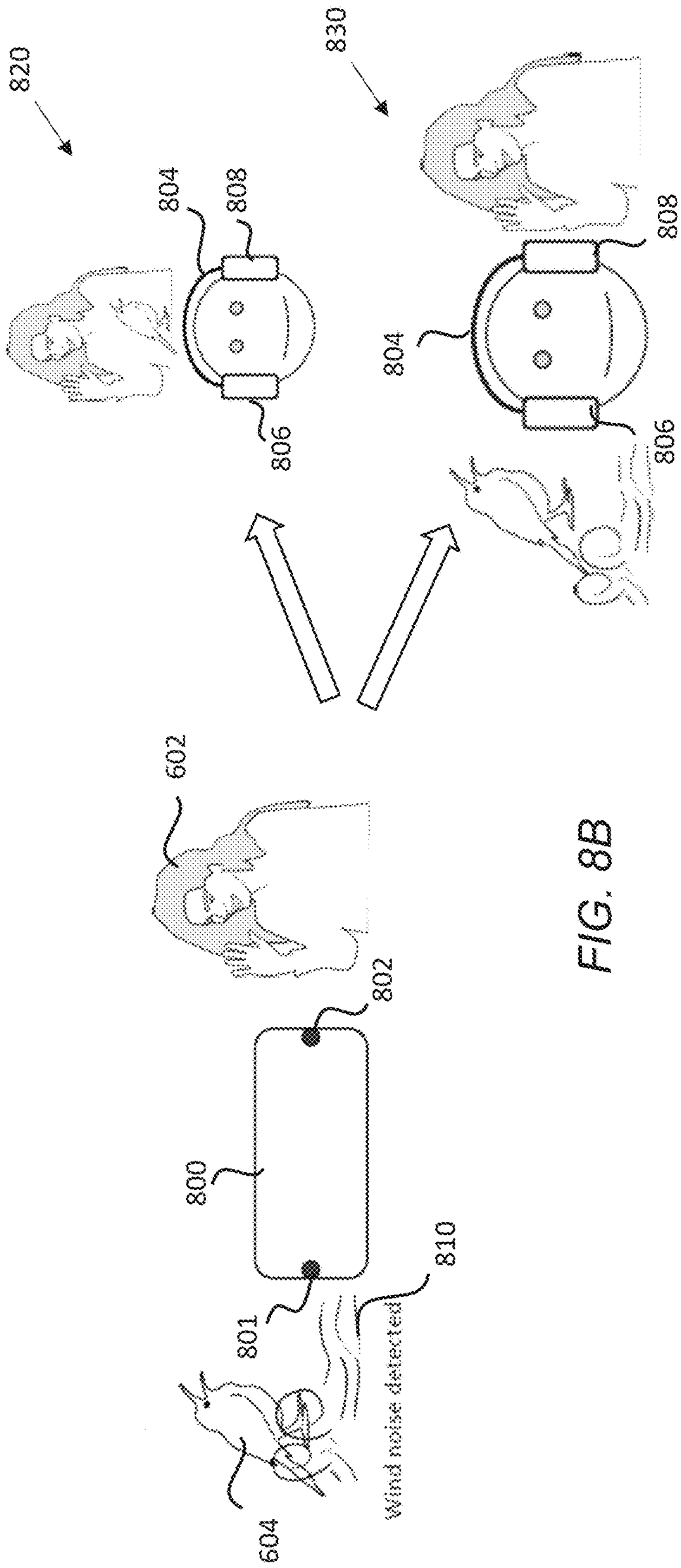

FIGS. 8A and 8B show more detailed scenarios indicating particular modifications that may be performed in the third operation 503.

FIG. 8A shows a smartphone 800 when used to capture just the aforementioned first audio source 602 and the second audio source 604. The smartphone 800 comprises a left-hand microphone 801 and a right-hand microphone 802. It is indicated by the right-hand part of the figure that, in the absence of unwanted noise, the user hears, via an output device (in the form of a pair of headphones 804 comprising left and right-hand speakers 806, 808), a stereo or spatial audio signal. This stereo or spatial audio signal is generated using a suitable codec based on received individual audio signals from the left-hand microphone 801 and the right-hand microphone 802.

FIG. 8B shows what happens responsive to wind noise 810 being detected, in this case in the individual audio signal from the left-hand microphone 801. This is dependent on level of spatial interest mentioned above.

In a first sub-scenario, indicated by reference numeral 820, the level of spatial interest meets the predetermined condition in the third operation 503. In other words, a low level of spatial interest is determined, possibly because greater than two significant audio sources are required in the audio scene or because more than one significant audio source is required and one of the first and second audio sources 602, 604 is not considered a significant audio source. In consequence, the stereo or spatial audio signal is modified to produce a reduced directional and/or spatial representation of the audio scene. More specifically, the first and second audio sources are output in monaural format.

In a second sub-scenario, indicated by reference numeral 830, the level of spatial interest does not meet the predetermined condition in the third operation 503. In other words, a high level of spatial interest is determined, possibly because the predetermined condition simply requires two or more significant audio sources and the first and second audio sources 602, 604 are considered as such. In consequence, the stereo or spatial audio signal is maintained without change even though the wind noise remains.

Example Apparatus

Figure 9:
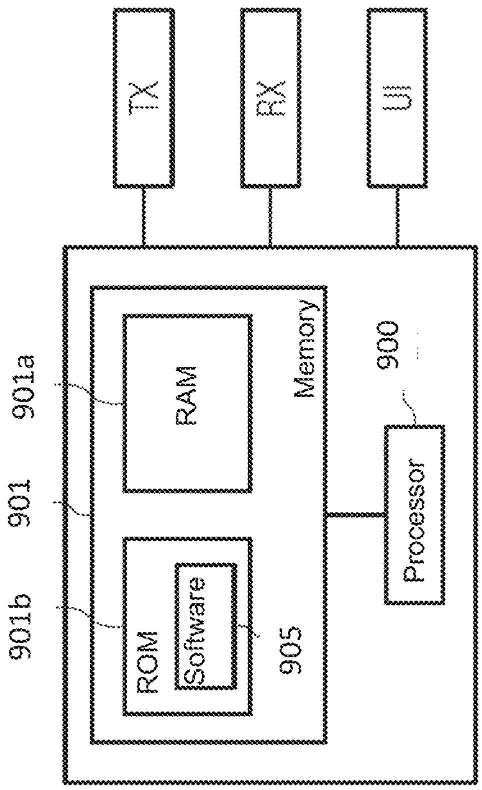
FIG. 9 shows an apparatus according to some example embodiments.

FIG. 9 shows an apparatus according to some example embodiments. The apparatus may be configured to perform the operations described herein, for example operations described with reference to any disclosed process. The apparatus comprises at least one processor 900 and at least one memory 901 directly or closely connected to the processor. The memory 901 includes at least one random access memory (RAM) 901*a* and at least one read-only memory (ROM) 901*b*. Computer program code (software) 905 is stored in the ROM 901*b*. The apparatus may be connected to a transmitter (TX) and a receiver (RX). The apparatus may, optionally, be connected with a user interface (UI) for instructing the apparatus and/or for outputting data. The at least one processor 900, with the at least one memory 901 and the computer program code 905 are arranged to cause the apparatus to at least perform at least the method according to any preceding process, for example as disclosed in relation to the flow diagrams of FIG. 5 and related features thereof.

FIG. 10 shows a non-transitory media 1000 according to some example embodiments. The non-transitory media 1000 is a computer readable storage medium. It may be, e.g., a CD, a DVD, a USB stick, a blue ray disk, etc. The non-transitory media 1300 stores computer program code, causing an apparatus to perform the method of any preceding process for example as disclosed in relation to the flow diagrams of FIG. 5 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be, e.g., a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising:

at least one processor; and at least one memory storing instructions that, when executed by the at least one processor, cause the apparatus at least to:

provide a stereo or spatial audio signal produced using individual signals from respective microphones of a user device, the stereo or spatial audio signal representing an audio scene;

detect unwanted noise in at least one of the individual signals;

responsive to detecting the unwanted noise, modify the stereo or spatial audio signal based on a determined level of spatial interest in the audio scene meeting a predetermined condition, wherein the determined level of spatial interest in the audio scene is a value based at least in part on a number of significant audio sources in the audio scene; and provide the modified audio signal for output via one or more speakers.

2. The apparatus of claim 1, wherein the modifying further comprises;

produce at least one of a reduced directional or spatial representation of the audio scene.

3. The apparatus of claim 2, wherein the audio scene is represented by a stereo signal and wherein the modifying comprises producing a monaural version of the audio scene.

4. The apparatus of claim 3, wherein the modifying comprises producing a monaural version of the audio scene and providing the monaural version on first and second channels for stereo output via at least two speakers.

5. The apparatus of claim 2, wherein the audio scene is represented by a spatial audio signal and wherein the modifying further comprises; produce a stereo or monaural version of the audio scene.

6. The apparatus of claim 2, wherein the modifying further comprises; produce the at least one of reduced directional or spatial representation of the audio scene by suppressing the at least one individual signal in which the unwanted noise is detected.

7. The apparatus of claim 6, wherein the modifying further comprises; suppress the at least one individual signal by disabling the at least one of respective microphones which produce the at least one individual signal in which the unwanted noise is detected.

8. The apparatus of claim 1, wherein the modifying further comprises; modify the stereo or spatial audio signal until the unwanted noise is at least no longer detected in at least one of the individual signals.

9. The apparatus of claim 1, wherein the unwanted noise is wind noise.

10. The apparatus of claim 1, wherein the apparatus is further caused to:

identify significant audio sources in the audio scene, wherein the predetermined condition is met if the value is below a predetermined threshold.

11. The apparatus of claim 10, wherein the significant audio sources are identified based on respective properties of one or more audio sources in the audio scene, the respective properties comprising one or more of:

frequency band;

energy level;

type of audio source;

temporal activity over a predetermined time period;

direction relative to a reference direction of the user device; or direction relative to a gaze direction of a user of the user device.

12. The apparatus of claim 10, wherein the significant audio sources are identified based at least in part on one or more of the audio sources in the audio scene being speech-type audio source.

13. The apparatus of claim 10, wherein the significant audio sources are identified based at least in part on one or more of the audio sources in the audio scene having a direction within a predetermined angle of a reference direction of the user device or gaze direction of the user of the user device.

14. The apparatus of claim 13, wherein the reference direction of the user device corresponds with a direction of a camera of the user device.

15. The apparatus of claim 13, wherein the predetermined angle is substantially 180 degrees or less.

16. A method comprising:

providing a stereo or spatial audio signal produced using individual signals from respective microphones of a user device, the stereo or spatial audio signal representing an audio scene;

detecting unwanted noise in at least one of the individual signals;

responsive to detecting the unwanted noise, modifying the stereo or spatial audio signal based on a determined level of spatial interest in the audio scene meeting a predetermined condition, wherein the determined level of spatial interest in the audio scene is a value based at least in part on a number of significant audio sources in the audio scene; and providing the modified audio signal for output via one or more speakers.

17. The method of claim 16, wherein the providing the modified audio signal further comprises producing at least one of a reduced directional or spatial representation of the audio scene.

18. The method of claim 17, wherein the audio scene is represented by a stereo signal and wherein the providing the modified audio signal further comprises producing a monaural version of the audio scene.

19. The method of claim 17, wherein the audio scene is represented by a spatial audio signal and wherein the providing the modified audio signal further comprises producing a stereo or monaural version of the audio scene.

20. A non-transitory computer readable medium comprising program instructions stored thereon for performing at least the following:

providing a stereo or spatial audio signal produced using individual signals from respective microphones of a user device, the stereo or spatial audio signal representing an audio scene;

detecting unwanted noise in at least one of the individual signals;

responsive to detecting the unwanted noise, modifying the stereo or spatial audio signal based on a determined level of spatial interest in the audio scene meeting a predetermined condition, wherein the determined level of spatial interest in the audio scene is a value based at least in part on a number of significant audio sources in the audio scene; and providing the modified audio signal for output via one or more speakers.

* * * * *